US 8,047,075 B2

(12) United States Patent
Nasiri et al.

(10) Patent No.: US 8,047,075 B2
(45) Date of Patent: Nov. 1, 2011

(54) VERTICALLY INTEGRATED 3-AXIS MEMS ACCELEROMETER WITH ELECTRONICS

(75) Inventors: Steven S. Nasiri, Saratoga, CA (US); Joseph Seeger, Menlo Park, CA (US); Goksen Yaralioglu, Mountain View, CA (US)

(73) Assignee: Invensense, Inc., Santa Clara, CA (US)

( * ) Notice: Subject to any disclaimer, the term of this patent is extended or adjusted under 35 U.S.C. 154(b) by 314 days.

(21) Appl. No.: 11/766,776

(22) Filed: Jun. 21, 2007

(65) Prior Publication Data
US 2008/0314147 A1 Dec. 25, 2008

(51) Int. Cl.
*G01P 15/125* (2006.01)
(52) U.S. Cl. .................... 73/514.32; 73/510
(58) Field of Classification Search ........... 73/514.32, 73/514.36, 514.38, 514.29, 514.16, 510, 73/511
See application file for complete search history.

(56) References Cited

U.S. PATENT DOCUMENTS

| | | |
|---|---|---|
| 4,510,802 A | 4/1985 | Peters |
| 4,601,206 A | 7/1986 | Watson |
| 4,736,629 A | 4/1988 | Cole |
| 4,783,742 A | 11/1988 | Peters |
| 4,841,773 A | 6/1989 | Stewart |
| 5,251,484 A | 10/1993 | Mastache |
| 5,349,858 A | 9/1994 | Yagi et al. |
| 5,359,893 A | 11/1994 | Dunn |
| 5,367,631 A | 11/1994 | Levy |
| 5,415,040 A | 5/1995 | Nottmeyer |
| 5,433,110 A | 7/1995 | Gertz et al. |
| 5,440,326 A | 8/1995 | Quinn |
| 5,444,639 A | 8/1995 | White |
| 5,511,419 A | 4/1996 | Dunn |
| 5,541,860 A | 7/1996 | Takei et al. |
| 5,574,221 A | 11/1996 | Park et al. |
| 5,629,988 A | 5/1997 | Burt et al. |
| 5,635,638 A | 6/1997 | Geen |
| 5,698,784 A | 12/1997 | Hotelling |

(Continued)

FOREIGN PATENT DOCUMENTS

EP 0429391 8/1995

OTHER PUBLICATIONS

Oboe, R., Lasalandra, E., White, M. M. MEMS-based Accelerometers and their Application to Vibration Suppression in Hard Disk Drives. MEMS/NEMS Handbook Techniques and Applications vol. 4, Springer 2006, pp. 1-29 see pp. 7-22.
Singh, Amit, "The Apple Motion Sensor as a Human Interface Device," www.kernelthread.com, 1994-2006.

(Continued)

*Primary Examiner* — Helen C. Kwok
(74) *Attorney, Agent, or Firm* — Sawyer Law Group, P.C.

(57) ABSTRACT

A system and method in accordance with the present invention provides for a low cost, bulk micromachined accelerometer integrated with electronics. The accelerometer can also be integrated with rate sensors that operate in a vacuum environment. The quality factor of the resonances is suppressed by adding dampers. Acceleration sensing in each axis is achieved by separate structures where the motion of the proof mass affects the value of sense capacitors differentially. Two structures are used per axis to enable full bridge measurements to further reduce the mechanical noise, immunity to power supply changes and cross axis coupling. To reduce the sensitivity to packaging and temperature changes, each mechanical structure is anchored to a single anchor pillar bonded to the top cover.

22 Claims, 9 Drawing Sheets

U.S. PATENT DOCUMENTS

| | | | |
|---|---|---|---|
| 5,703,293 A | 12/1997 | Zabler et al. | |
| 5,703,623 A | 12/1997 | Hall et al. | |
| 5,734,373 A | 3/1998 | Rosenberg et al. | |
| 5,780,740 A | 7/1998 | Lee et al. | |
| 5,825,350 A | 10/1998 | Case, Jr. | |
| 5,895,850 A | 4/1999 | Buestgens | |
| 5,898,421 A | 4/1999 | Quinn | |
| 5,955,668 A | 9/1999 | Hsu et al. | |
| 5,992,233 A | 11/1999 | Clark | |
| 5,996,409 A | 12/1999 | Funk et al. | |
| 6,067,858 A | 5/2000 | Clark et al. | |
| 6,122,961 A | 9/2000 | Geen et al. | |
| 6,134,961 A | 10/2000 | Touge et al. | |
| 6,158,280 A | 12/2000 | Nonomura | |
| 6,168,965 B1 | 1/2001 | Malinovich et al. | |
| 6,189,381 B1 | 2/2001 | Huang et al. | |
| 6,230,564 B1 * | 5/2001 | Matsunaga et al. | 73/514.01 |
| 6,250,156 B1 | 6/2001 | Seshia et al. | |
| 6,250,157 B1 | 6/2001 | Touge | |
| 6,269,254 B1 | 7/2001 | Mathis | |
| 6,279,043 B1 | 8/2001 | Hayward et al. | |
| 6,292,170 B1 | 9/2001 | Chang et al. | |
| 6,343,349 B1 | 1/2002 | Braun et al. | |
| 6,370,937 B2 | 4/2002 | Hsu | |
| 6,374,255 B1 | 4/2002 | Peurach et al. | |
| 6,386,033 B1 | 5/2002 | Negoro | |
| 6,391,673 B1 | 5/2002 | Ha et al. | |
| 6,393,914 B1 | 5/2002 | Zarabadi et al. | |
| 6,424,356 B2 | 7/2002 | Chang et al. | |
| 6,429,895 B1 | 8/2002 | Onuki | |
| 6,430,998 B2 | 8/2002 | Kawai et al. | |
| 6,480,320 B2 | 11/2002 | Nasiri | |
| 6,481,283 B1 | 11/2002 | Cardarelli | |
| 6,481,284 B2 | 11/2002 | Geen et al. | |
| 6,481,285 B1 | 11/2002 | Shkel et al. | |
| 6,487,369 B1 | 11/2002 | Sato | |
| 6,487,908 B2 | 12/2002 | Geen et al. | |
| 6,494,096 B2 * | 12/2002 | Sakai et al. | 73/514.32 |
| 6,508,122 B1 | 1/2003 | McCall et al. | |
| 6,508,125 B2 * | 1/2003 | Otani | 73/514.32 |
| 6,513,380 B2 | 2/2003 | Reeds, III et al. | |
| 6,520,017 B1 | 2/2003 | Schoefthaler et al. | |
| 6,533,947 B2 | 3/2003 | Nasiri et al. | |
| 6,573,883 B1 | 6/2003 | Bartlett | |
| 6,636,521 B1 | 10/2003 | Guillianelli | |
| 6,646,289 B1 | 11/2003 | Badehi | |
| 6,668,614 B2 * | 12/2003 | Itakura | 73/1.38 |
| 6,720,994 B1 | 4/2004 | Grottodden et al. | |
| 6,725,719 B2 | 4/2004 | Cardarelli | |
| 6,758,093 B2 | 7/2004 | Tang et al. | |
| 6,794,272 B2 | 9/2004 | Turner et al. | |
| 6,796,178 B2 | 9/2004 | Jeong et al. | |
| 6,823,733 B2 | 11/2004 | Ichinose | |
| 6,834,249 B2 | 12/2004 | Orchard | |
| 6,845,669 B2 | 1/2005 | Acar et al. | |
| 6,848,304 B2 | 2/2005 | Geen | |
| 6,859,751 B2 | 2/2005 | Cardarelli | |
| 6,860,150 B2 | 3/2005 | Cho | |
| 6,892,575 B2 | 5/2005 | Nasiri et al. | |
| 6,915,693 B2 | 7/2005 | Kim et al. | |
| 6,918,297 B2 | 7/2005 | MacGugan | |
| 6,918,298 B2 | 7/2005 | Park | |
| 6,938,484 B2 * | 9/2005 | Najafi et al. | 73/514.32 |
| 6,939,473 B2 | 9/2005 | Nasiri et al. | |
| 6,955,086 B2 * | 10/2005 | Yoshikawa et al. | 73/514.32 |
| 6,963,345 B2 | 11/2005 | Boyd et al. | |
| 6,972,480 B2 | 12/2005 | Zilber et al. | |
| 6,981,416 B2 * | 1/2006 | Chen et al. | 73/510 |
| 7,004,025 B2 | 2/2006 | Tamura | |
| 7,028,546 B2 | 4/2006 | Hoshal | |
| 7,028,547 B2 | 4/2006 | Shiratori et al. | |
| 7,036,372 B2 | 5/2006 | Chojnacki et al. | |
| 7,040,163 B2 | 5/2006 | Shcheglov et al. | |
| 7,040,922 B2 | 5/2006 | Harney et al. | |
| 7,057,645 B1 | 6/2006 | Hara et al. | |
| 7,077,007 B2 | 7/2006 | Rich et al. | |
| 7,104,129 B2 | 9/2006 | Nasiri et al. | |
| 7,121,141 B2 * | 10/2006 | McNeil | 73/514.32 |
| 7,154,477 B1 | 12/2006 | Hotelling et al. | |
| 7,155,975 B2 | 1/2007 | Mitani et al. | |
| 7,158,118 B2 | 1/2007 | Liberty | |
| 7,159,442 B1 | 1/2007 | Jean | |
| 7,168,317 B2 | 1/2007 | Chen | |
| 7,180,500 B2 | 2/2007 | Marvit et al. | |
| 7,196,404 B2 | 3/2007 | Schirmer et al. | |
| 7,210,351 B2 * | 5/2007 | Lo et al. | 73/514.32 |
| 7,222,533 B2 | 5/2007 | Mao et al. | |
| 7,236,156 B2 | 6/2007 | Liberty et al. | |
| 7,237,437 B1 | 7/2007 | Fedora | |
| 7,239,301 B2 | 7/2007 | Liberty et al. | |
| 7,240,552 B2 | 7/2007 | Acar et al. | |
| 7,243,561 B2 | 7/2007 | Ishigami et al. | |
| 7,247,246 B2 | 7/2007 | Nasiri et al. | |
| 7,250,112 B2 | 7/2007 | Nasiri et al. | |
| 7,258,011 B2 | 8/2007 | Nasiri et al. | |
| 7,260,789 B2 | 8/2007 | Hunleth et al. | |
| 7,262,760 B2 | 8/2007 | Liberty | |
| 7,284,430 B2 | 10/2007 | Acar et al. | |
| 7,289,898 B2 | 10/2007 | Hong et al. | |
| 7,290,435 B2 | 11/2007 | Seeger et al. | |
| 7,299,695 B2 | 11/2007 | Tanaka et al. | |
| 7,325,454 B2 | 2/2008 | Saito et al. | |
| 7,331,212 B2 | 2/2008 | Manlove et al. | |
| 7,333,087 B2 | 2/2008 | Soh et al. | |
| 7,352,567 B2 | 4/2008 | Hotelling et al. | |
| 7,377,167 B2 | 5/2008 | Acar et al. | |
| 7,386,806 B2 | 6/2008 | Wroblewski | |
| 7,395,181 B2 | 7/2008 | Foxlin | |
| 7,414,611 B2 | 8/2008 | Liberty | |
| 7,424,213 B2 | 9/2008 | Imada | |
| 7,437,931 B2 | 10/2008 | Dwyer et al. | |
| 7,442,570 B2 | 10/2008 | Nasiri et al. | |
| 7,458,263 B2 | 12/2008 | Nasiri et al. | |
| 7,508,384 B2 | 3/2009 | Zhang et al. | |
| 7,522,947 B2 | 4/2009 | Tsuda | |
| 7,533,569 B2 | 5/2009 | Sheynblat | |
| 7,549,335 B2 | 6/2009 | Inoue et al. | |
| 7,552,636 B2 | 6/2009 | Datskos | |
| 7,617,728 B2 | 11/2009 | Cardarelli | |
| 7,621,183 B2 | 11/2009 | Seeger et al. | |
| 7,677,099 B2 | 3/2010 | Nasiri et al. | |
| 7,677,100 B2 | 3/2010 | Konaka | |
| 7,765,869 B2 | 8/2010 | Sung et al. | |
| 7,779,689 B2 | 8/2010 | Li et al. | |
| 7,783,392 B2 | 8/2010 | Oikawa | |
| 7,784,344 B2 | 8/2010 | Pavelescu et al. | |
| 2002/0027296 A1 | 3/2002 | Badehi | |
| 2002/0189351 A1 | 12/2002 | Reeds et al. | |
| 2003/0159511 A1 | 8/2003 | Zarabadi et al. | |
| 2004/0016995 A1 | 1/2004 | Kuo et al. | |
| 2004/0066981 A1 | 4/2004 | Li et al. | |
| 2004/0160525 A1 | 8/2004 | Kingetsu et al. | |
| 2004/0179108 A1 | 9/2004 | Sorek et al. | |
| 2005/0066728 A1 | 3/2005 | Chojnacki | |
| 2005/0110778 A1 | 5/2005 | Ben Ayed | |
| 2005/0170656 A1 | 8/2005 | Nasiri et al. | |
| 2005/0212751 A1 | 9/2005 | Marvit et al. | |
| 2006/0017837 A1 | 1/2006 | Sorek et al. | |
| 2006/0032308 A1 | 2/2006 | Acar et al. | |
| 2006/0033823 A1 | 2/2006 | Okamura | |
| 2006/0061545 A1 | 3/2006 | Hughes et al. | |
| 2006/0115297 A1 | 6/2006 | Nakamaru | |
| 2006/0119710 A1 | 6/2006 | Ben-Ezra et al. | |
| 2006/0139327 A1 | 6/2006 | Dawson et al. | |
| 2006/0164382 A1 | 7/2006 | Kulas et al. | |
| 2006/0164385 A1 | 7/2006 | Smith et al. | |
| 2006/0185502 A1 | 8/2006 | Nishitani et al. | |
| 2006/0187308 A1 | 8/2006 | Lim et al. | |
| 2006/0251410 A1 | 11/2006 | Trutna, Jr. | |
| 2007/0035630 A1 | 2/2007 | Lindenstruth et al. | |
| 2007/0063985 A1 | 3/2007 | Yamazaki et al. | |
| 2007/0113207 A1 | 5/2007 | Gritton | |
| 2007/0146325 A1 | 6/2007 | Poston et al. | |
| 2007/0167199 A1 | 7/2007 | Kang | |
| 2007/0176898 A1 | 8/2007 | Suh | |
| 2008/0009348 A1 | 1/2008 | Zalewski et al. | |
| 2008/0088602 A1 | 4/2008 | Hotelling | |

| | | |
|---|---|---|
| 2008/0098315 A1 | 4/2008 | Chou et al. |
| 2008/0134784 A1 | 6/2008 | Jeng et al. |
| 2008/0158154 A1 | 7/2008 | Liberty et al. |
| 2008/0204566 A1 | 8/2008 | Yamazaki et al. |
| 2008/0314147 A1 | 12/2008 | Nasiri et al. |
| 2009/0005975 A1 | 1/2009 | Forstall et al. |
| 2009/0005986 A1 | 1/2009 | Soehren |
| 2009/0043504 A1 | 2/2009 | Bandyopadhyay et al. |
| 2009/0088204 A1 | 4/2009 | Culbert et al. |
| 2009/0326851 A1 | 12/2009 | Tanenhaus |
| 2010/0013814 A1 | 1/2010 | Jarczyk |

OTHER PUBLICATIONS

Cho, et al., Dynamics of Tilt-based Browsing on Mobile Devices. CHI 2007, Apr. 28-May 3, 2007, San Jose, California, USA., pp. 1947-1952.

* cited by examiner

VERTICALLY INTEGRATED 3-AXIS MEMS ACCELEROMETER WITH ELECTRONICS

FIELD OF THE INVENTION

The present invention relates generally to motion sensing devices and more specifically to accelerometers that are utilized in integrated circuits.

BACKGROUND OF THE INVENTION

Accelerometers are widely used for motion sensing applications. Conventionally, an accelerometer consists of a suspended proof mass and a means of measuring the proof mass displacement with respect to the reference frame. Recent advances in microelectronics technology enabled fabrication of accelerometers with integrated electronics in volume production. One of the first applications of these integrated micromachined sensors was in airbag deployment for automobiles (Analog Device's XL50).

The first accelerometer products that were fabricated using MEMS technology were introduced by large corporations such as Analog Devices, ST and Bosch who had already infrastructure to produce integrated circuits. Integrated circuit fabrication mostly involves depositing several dielectric layers and selectively etching these layers. Therefore the first MEMS accelerometers were fabricated using the same techniques due to the ease of integration with electronics and compatibility with existing CMOS manufacturing equipment.

Building mechanical structures on silicon wafer based on the deposition and etching of different structural layers is called surface micromachining. In surface micromachining usually a sacrificial layer is deposited on a substrate followed by a deposition of mechanical layer where the moving parts of the accelerometer are going to be defined. The moving parts are later released by selectively removing the sacrificial layer. This method has many shortcomings for building low cost and high performance accelerometers. For example, there are contradicting requirements over the area (cost) of the accelerometer and the noise performance. The Brownian noise level of the accelerometer is proportional to the size of the proof mass. In surface micromachining, the proof mass height is determined by the deposited film thickness which is usually limited to less than 10 microns. Therefore, building heavy proof masses requires relatively large area which in return increases the cost.

Surface micromachining also necessitates complex fabrication steps. Depositing thick films which are required for low accelerometer noise is a very sophisticated process. Moreover, non-uniformity of the deposited films and large variation of the material properties have negative impact on the process yield and cost. Controlling stress level in the film is another issue which needs to be dealt with otherwise undesired curling of the released structures may occur. In addition, moveable parts released by using sacrificial wet etching may suffer from the stiction problem if their mechanical properties are not selected properly. Stiction can be avoided by fabricating structures with high spring constants. But this adversely affects the sensitivity of the accelerometer where the sensitivity is inversely proportional to the resonant frequency. Therefore, stiction problem limits the accelerometer sensitivity.

In addition to above described technical difficulties, surface micromachining tools are not readily available to small companies. Most of the required equipment can only be supported by a complicated infrastructure that only large companies can afford. This sets a very high barrier for small start-up companies that want to enter the accelerometer market. Surface micromachining is not a feasible solution for companies which do not have access to the expensive fabrication equipment.

Bulk micromachining, on the other hand, overcomes most of the technical difficulties of surface micromachining as well as it provides a viable solution for fabless semiconductor MEMS companies. In contrast to surface micromachining, bulk micromachining defines structures by selectively etching the substrate. Since the height of the structures is defined in the substrate, it is possible to build accelerometers with increased height and reduced foot print without the complexities associated with building structures using deposited layers. Increased mass in a small foot print provides fabricating accelerometer with better noise performance at a reduced cost. In addition, bulk micromachining techniques are readily available through MEMS foundries. Bulk micromachined devices can easily be built on off the shelf SOI (silicon on insulator) substrates.

Another important process step for fabricating low cost MEMS device is the integration of mechanical parts with the electronics. To address this need "Nasiri-Fabrication" platform was introduced previously (U.S. Pat. No. 7,104,129, entitled "Vertically integrated MEMS structure with electronics in a hermetically sealed cavity"). This fabrication process makes use of bulk micromachining and readily allows for the wafer level integration of the MEMS substrate and the electronics (CMOS) substrate. In addition to integration, this method encapsulates the mechanical parts in a low pressure hermetically sealed chamber that protects the MEMS device against adverse effect of environment such as humidity. In summary, use of bulk micromachining and water scale MEM-CMOS integration result in low cost and high performance accelerometers. This patent describes a novel accelerometer design that uses bulk silicon machining and Nasiri-Fabrication integration solution.

There is a need for a small low cost high performance accelerometer. The present invention addresses such a need.

SUMMARY OF THE INVENTION

An accelerometer that is fabricated by bulk micromachining and integrated with CMOS wafer by Nasiri-Fabrication process is disclosed. The accelerometer comprises an actuator substrate; a reference substrate; and at least one moving proof mass on the actuator substrate. The proof mass is anchored to a cover plate at a single point, on the reference substrate with at least one flexure spring. The accelerometer also includes at least one electrode coupled to each proof mass, wherein a capacitance of the electrode increases and decreases with the motion of the other proof mass.

In one embodiment, a process is utilized that provides a low pressure cavity for hermetic protection of the moving parts from moisture and as such. Hence added features in the design are to allow for squeeze film dampening in order for the accelerometer to operate properly. The quality factor of the accelerometer resonances is suppressed by these dampers. The accelerometer can also be integrated with gyroscopes, that operate in a low pressure environment, without a need for separately encapsulating the sensors in different chambers.

Acceleration sensing in each axis is achieved by separate structures where the motion of the proof mass affects the value of sense capacitor. Two structures can be used per axis to enable full bridge measurements to further reduce the mechanical noise, susceptibility to power supply changes, cross axis coupling and the complexity of the sense electronics. To reduce the sensitivity to packaging and temperature changes, each mechanical structure is anchored to a single anchor pillar bonded to the top cover.

DETAILED DESCRIPTION

The present invention relates generally to motion sensing devices and more specifically to accelerometers utilized in integrated circuits. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

A method and system in accordance with the present invention relates to the accelerometers that are fabricated using silicon micromachining methods that have been described in U.S. Pat. No. 6,892,575, entitled "X-Y axis dual-mass tuning fork gyroscope with vertically integrated electronics and wafer-scale hermetic packaging", issued May 17, 2005, and assigned to the assignee of the present application; and Published Application No. US2005/0170656, entitled "Vertical Integration of a Mems Structure with Electronics in a Hermetically Sealed Cavity," filed Feb. 2, 2004, and assigned to the assignee of the present application, both of which are incorporated by reference in their entirety herein.

Figure 1A:
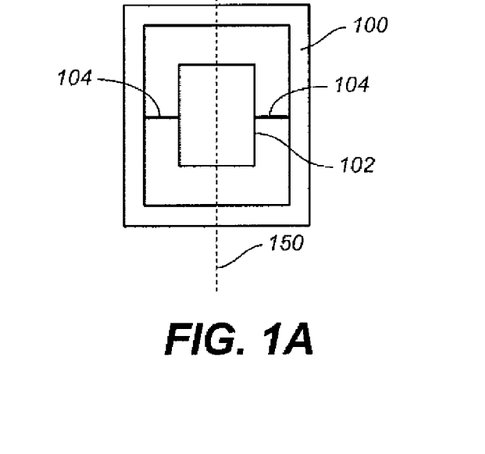
FIG. 1A shows a top view of a portion of a MEMS assembly according to an embodiment.

FIG. 1A shows a top view of a portion of a MEMS assembly according to an embodiment. A MEMS device element 102 is positioned within a substantially planar frame 100. Device element 102 can be a proof mass for an inertial sensor, such as an accelerometer or a gyroscope. Alternatively, device element 102 can be a movable element such as a mirror for optical applications, or a movable element within an RF device such as a switch or a resonator. In the example of FIG. 1, device element 102 is flexibly connected to frame 100 with flexures 104. Flexures 104 can be either rotational flexures, permitting rotation about an axis, or translational flexures, permitting linear motion in a particular direction. Frame 100 and device element 102 can be regarded as being included in a MEMS subassembly. More generally, a wide variety of vertical MEMS devices, including inertial sensors such as gyroscopes and accelerometers, optical devices, and RF devices, have a MEMS subassembly having a substantially planar frame and at least one MEMS device element (such as a proof mass) within the frame.

Figure 1B:
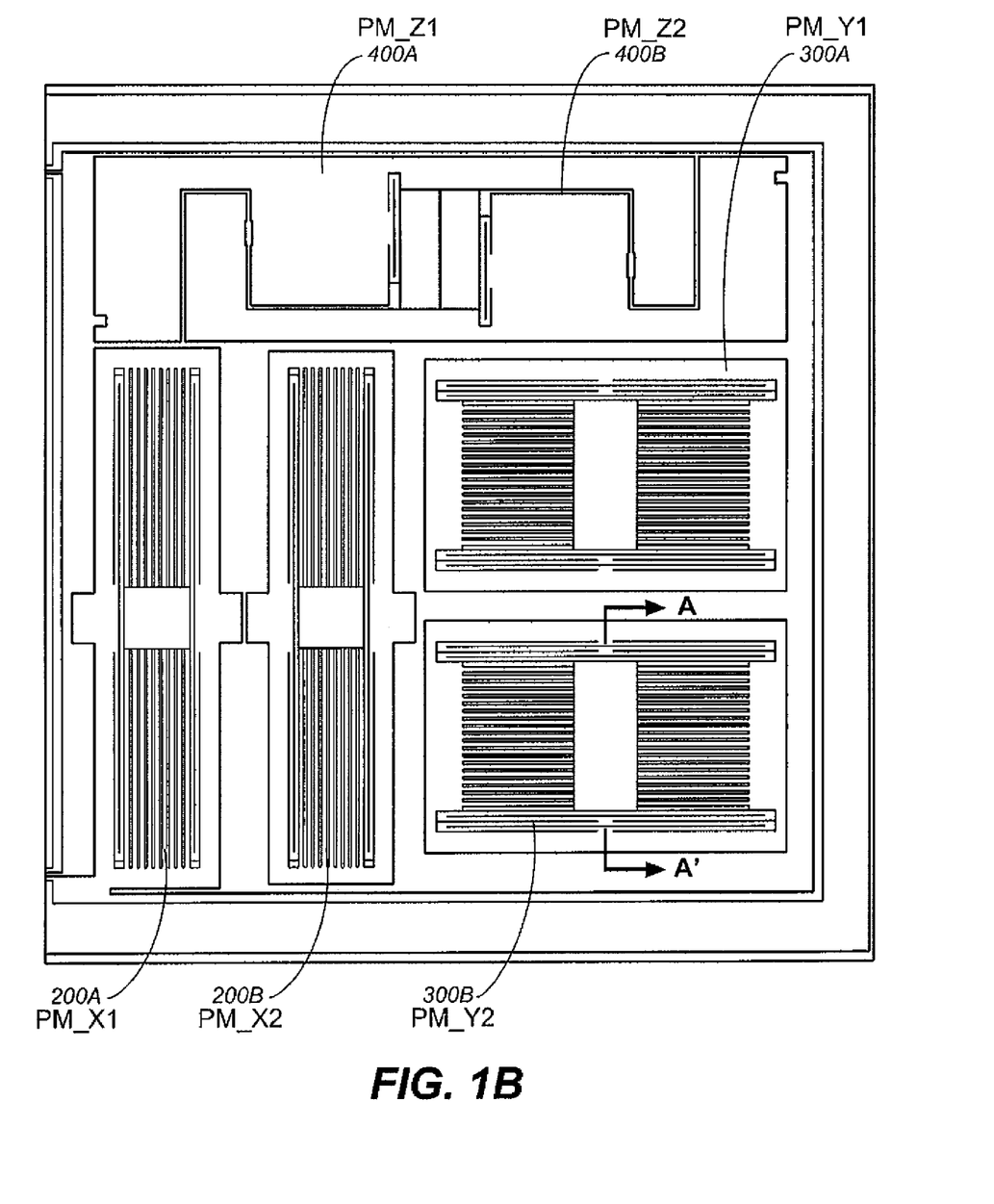
FIG. 1B illustrates an accelerometer in accordance with the present invention.

Accordingly, these references disclose that the proof masses of the accelerometers are defined on a MEMS wafer that will be attached to a CMOS wafer to form a vacuum sealed cavity. The MEMS wafer is composed of two layers, actuator layer and cover layer. The MEMS structures are fabricated on the actuator layer that is bonded to the cover layer which has cavities over the moving parts. FIG. 1B shows a typical cross section of the accelerometer. The proof mass 102 is attached to an anchor 103 which is connected to a top cover plate 109. The anchor 103 provides the electrical connection to the proof mass 102. The anchor can be connected to the sense substrate 107 under the anchor 103 as shown in FIG. 1B or the electrical connections can be made through another structure between the anchor 103 and the substrate 107.

The previously mentioned "Nasiri-Fabrication" process described in U.S. Pat. No. 7,104,129 provides a low pressure cavity for hermetic protection of the moving parts from moisture and as such. Hence added features in the design are to allow for squeeze film dampening in order for the accelerometer to operate properly. The quality factor of the accelerometer resonances is suppressed by these dampers. The accelerometer can also be integrated with gyroscopes, that operate in a low pressure environment, without a need for separately encapsulating the sensors in different chambers.

Figure 1C:
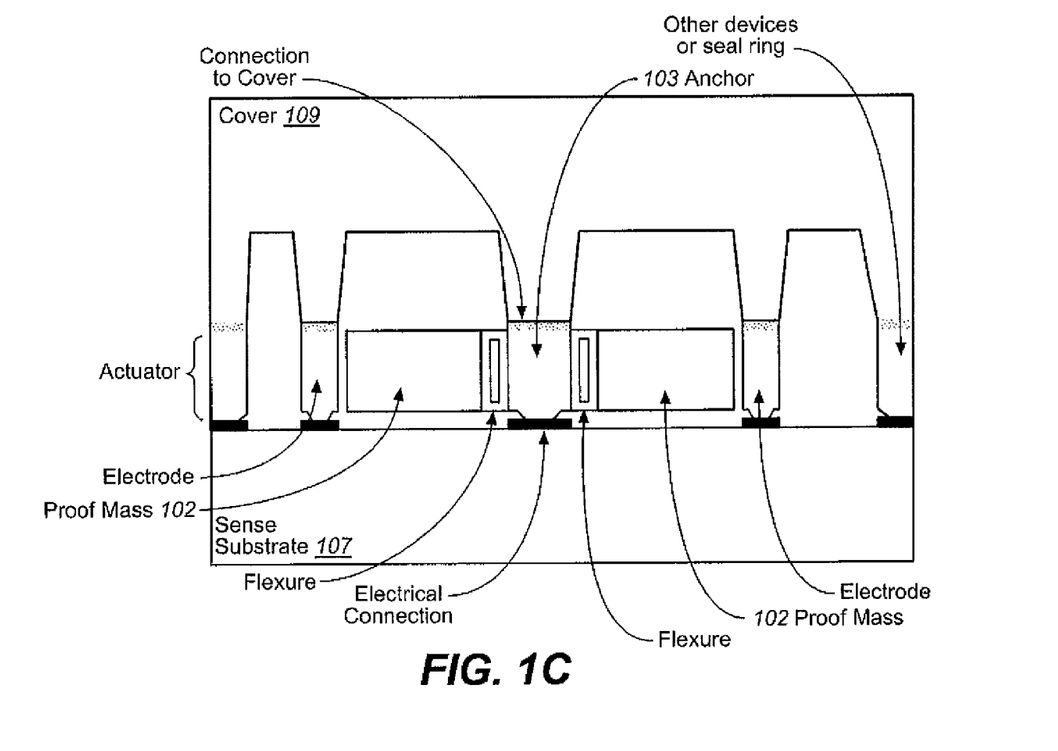
FIG. 1C shows the cross section AA' of Y-accelerometer.

An accelerometer in accordance with the present invention uses three different structures for each axis and may use one or more proof masses per axis. FIG. 1C illustrates an accelerometer with six proof masses 200a, 200b, 300a, 300b, 400a and 400b in accordance with the present invention. As is seen, proof masses 200a and 200b are for the X-axis accelerometer, proof masses 300a and 300b are for the Y-axis accelerometer and proof masses 400a and 400b are for the Z-axis accelerometer. The following will discuss the features of the above described structures.

Structures for X-Axis Accelerometer and Y-Axis Accelerometer

Figure 2A:
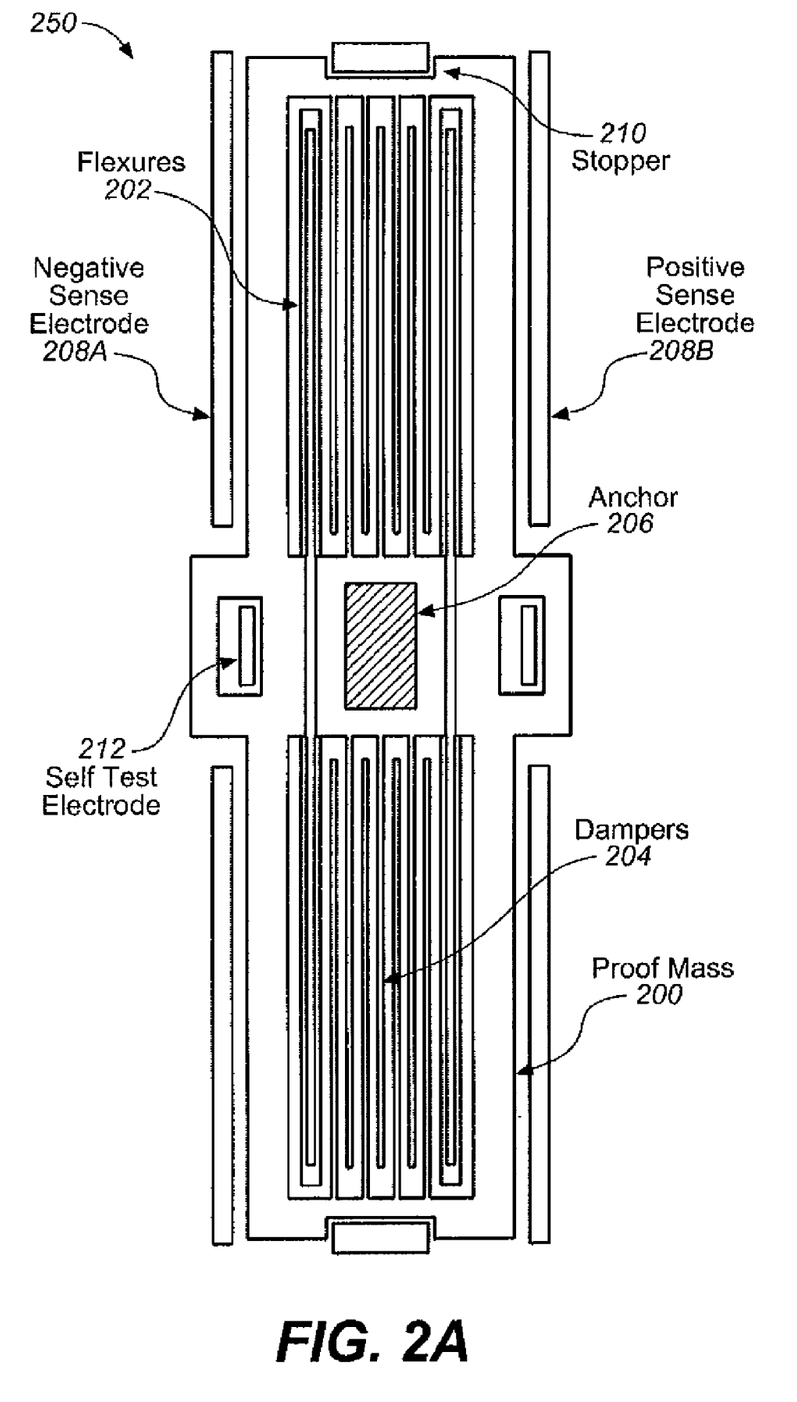
FIGS. 2A and 2B illustrate one structure for an X-axis accelerometer and one structure for a Y-axis accelerometer, respectively in accordance with the present invention.
Figure 2B:
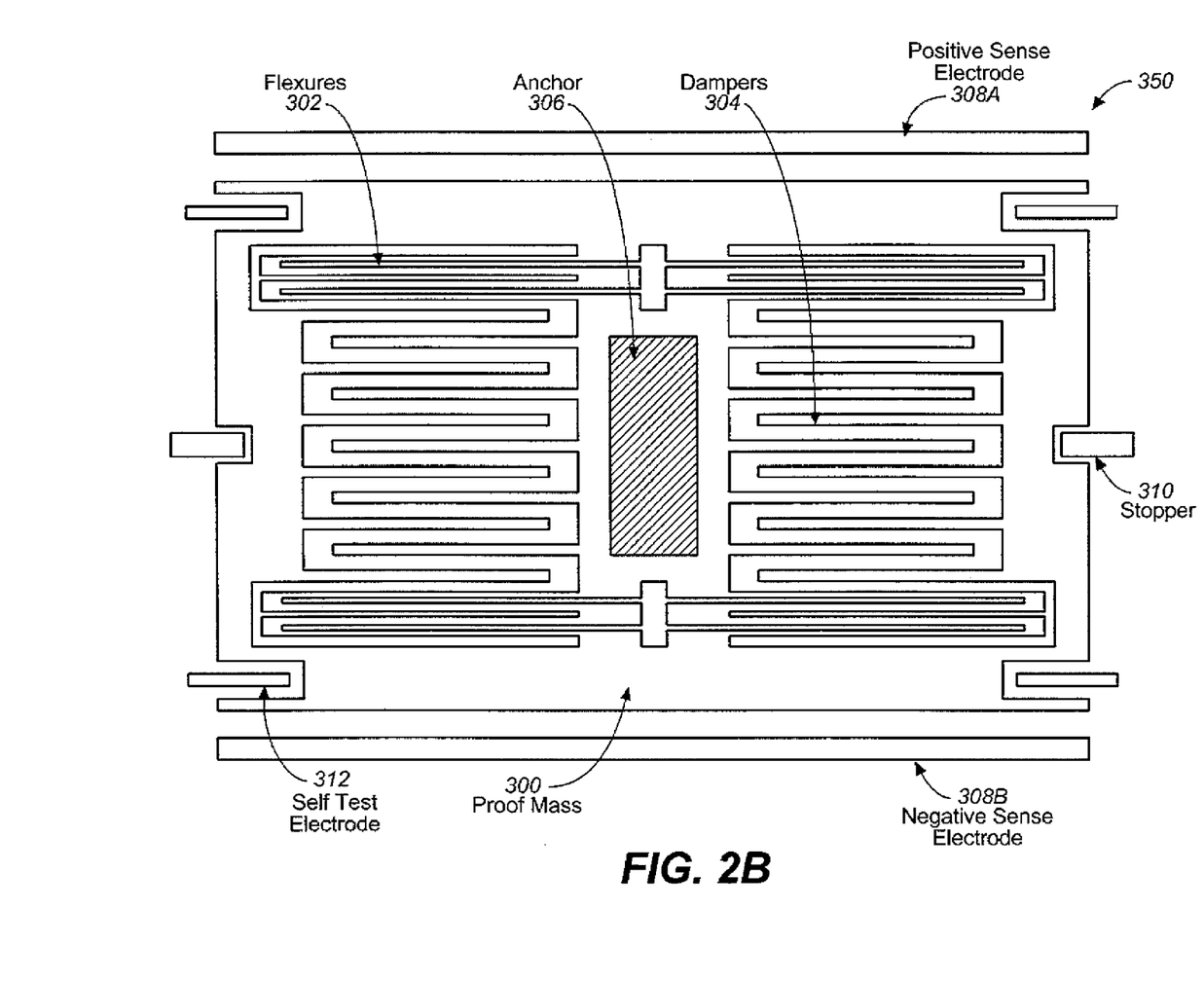

The structures for proving an X-axis accelerometer and a Y-axis accelerometer are very similar to each other. To describe these two types of accelerometers in more detail refer now to the following description in conjunction with the accompanying Figures. FIGS. 2A and 2B illustrate one structure 250 for an X-axis accelerometer and one structure 350 for a Y-axis accelerometer, respectively, in accordance with the present invention. The structures 250 and 350 can be utilized interchangeably to enable the best use of the available area. Each of the x-axis accelerometer and y-axis accelerometer would utilize one or more of these structures to measure acceleration in two directions.

Each of the accelerometers 250 and 350 comprise a proof mass 200 and 300, flexural springs 202 and 302 and dampers 204 and 304. The mechanical parts are fabricated for example, by using deep reactive ion etching (DRIE) of a low resistivity single crystal silicon wafer. The proof mass 200 and 300 is attached to an anchor 206 and 306 through the flexural springs 202 and 302 as shown in FIGS. 2A and 2B. The anchors 206 and 306 are attached to an upper cover (not shown) for example by diffusion bonding and are attached to the CMOS die (not shown), for example, by eutectic bonding. An oxide layer electrically insulates the anchor 206 and 306 and therefore the proof mass 200 and 300 from the cover but eutectic bond between the anchor and the CMOS electronics enables the electrical connections to the proof mass 200 and 300. The proof masses 200 and 300 can be also connected to the substrate electrically through a soft spring. The main difference between the structure 250 and the structure 350 is that structure 250 uses a two folded flexural springs 209 whereas structure 350 uses four folded flexural springs 302. By increasing the number of folds one can reduce the length of the springs while keeping the spring constant the same. This allows combining sensors with different aspect ratios on the substrate for efficient use of the surface area.

In a preferred embodiment, the motion of the proof mass 200 and 300 is sensed by parallel plate electrodes 208a, 208b and 308a, 308b that are placed perpendicular to the motion of the proof mass 200 and 300. The electrodes 208a, 208b and 308a, 308b are held fixed by means of diffusion and eutectic bond. Each pair of electrodes 208a, 208b and 308a, 308b is used to enable differential capacitance sensing. The capacitance sensing can be implemented utilizing a bridge configuration. This feature will be described in detail later in this specification.

The dampers 204 and 304 attached to the proof mass 200 and 300 and the anchor 206 and 306 introduce damping to lower the quality factor of the resonance. The dampers 204 and 304 allow for the proper operation of the accelerometers in a low pressure vacuum environment which is required for the rate sensor operation.

Figure 2C:
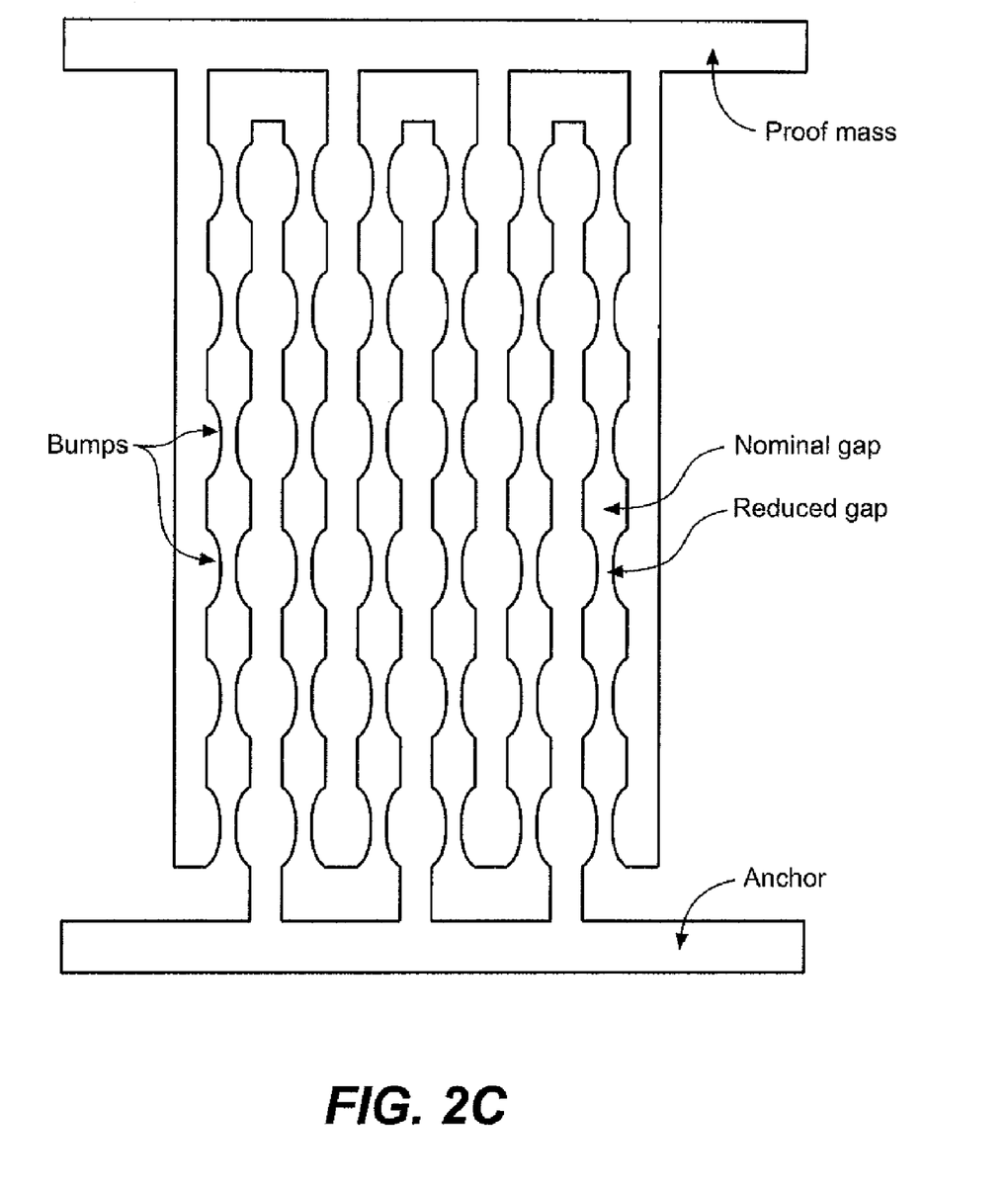
FIG. 2C shows bumps along the dampers of an accelerometer to increase the damping effect.

It is desirable to fabricate dampers with very small gaps in between to increase the squeezed film damping. However, fabrication (usually DRIE) limitations dictate the minimum gap that can be achieved over a long distance. FIG. 2C shows bumps along the dampers to increase the damping effect. The bumps along the dampers reduce the gap in between without pushing the limits of the DRIE process.

The over range limiters (stoppers) 210 and 310 are provided in the sense direction since in this direction the springs have the lowest spring constants. The over range limit in the other directions can be either provided by other sets of stoppers or by making the spring constants very high. As shown in FIGS. 2A and 2B, a single anchor 206 and 306 point connects the structures to the substrate. Therefore, the effect of relative stress between the package and the substrate is minimized on the performance of the accelerometer. Finally, self test electrodes 212 and 312 are also incorporated into the accelerometers as shown in FIGS. 2A and 2B.

Structures for Z-Axis Accelerometer

Figure 3A:
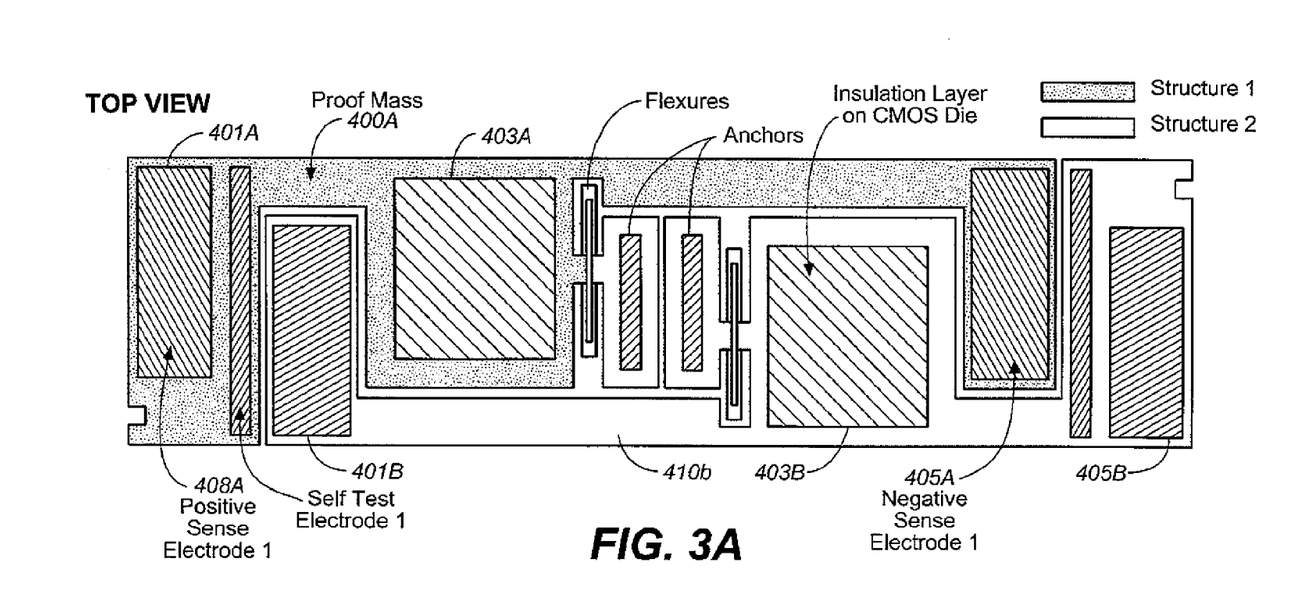
FIGS. 3A and 3B illustrate a top view and a side view, respectively of a Z axis accelerometer in accordance with the present invention.
Figure 3B:
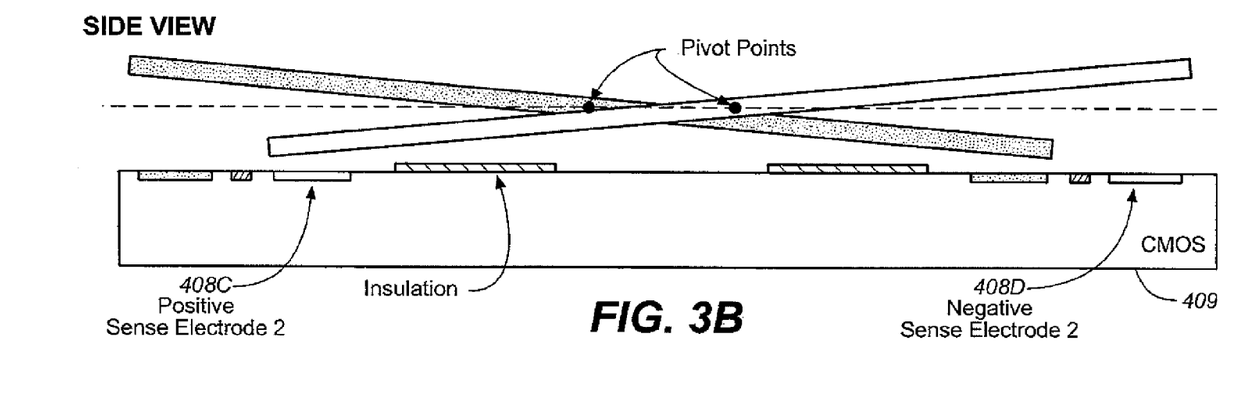

FIGS. 3A and 3B illustrate a top view and a side view, respectively of a Z axis accelerometer 450 in accordance with the present invention. The figure illustrates usage of two proof masses per axis, but only one structure can also be used for acceleration detection in Z-direction. Both structures of the accelerometer are depicted in the figures unlike FIGS. 2A and 2B where only one of the structures for the accelerometers is depicted per axis. For the Z-axis accelerometer 450, the two structures are packed such that to make the best use of available chip area. A lever arm for each structure 410a and 410b pivoted at the center is attached to three proof mass systems 401a, 403a, 405a and 401b, 403b and 405b. The total weight on the each side of the lever arm 410a and 410b is different. When there is acceleration in the Z direction this results in a bending of the lever arm around the pivot point. The electrodes 408a and 408b placed under the outer most proof mass systems 401a, 405a, 401b and 405b on the CMOS reference substrate 409 enable differential measurement. The center proof mass 403a and 403b adds more weight to one side of the lever arm.

To increase the damping further, one can place a thin film under proof masses 403a and 403b reducing the gap between the CMOS die and the proof mass. The placement and the shape of the proof masses are chosen such that the two accelerometers can be fit in a very small area as shown FIG. 3A. The spring constant of the Z-axis accelerometer is also low in Y-axis direction. This makes it sensitive to the Y-axis acceleration. If there is no process variation along the thickness direction or if the side walls are perfectly 90 degrees this does not cause any cross-axis sensitivity since the capacitance will not change with translational motion provided that the electrodes on the CMOS are smaller than the proof masses. However, imperfections in the fabrication usually result in some coupling from Y axis to Z axis. But since there are two structures used to detect Z-motion in a full bridge configuration, this coupling will be canceled. To describe the detection of the change in capacitance utilizing the structures of FIGS. 2A, 2B, 3A and 3B, refer now to the following description in conjunction with the accompanying figures.

Electronic Detection

Figure 4:
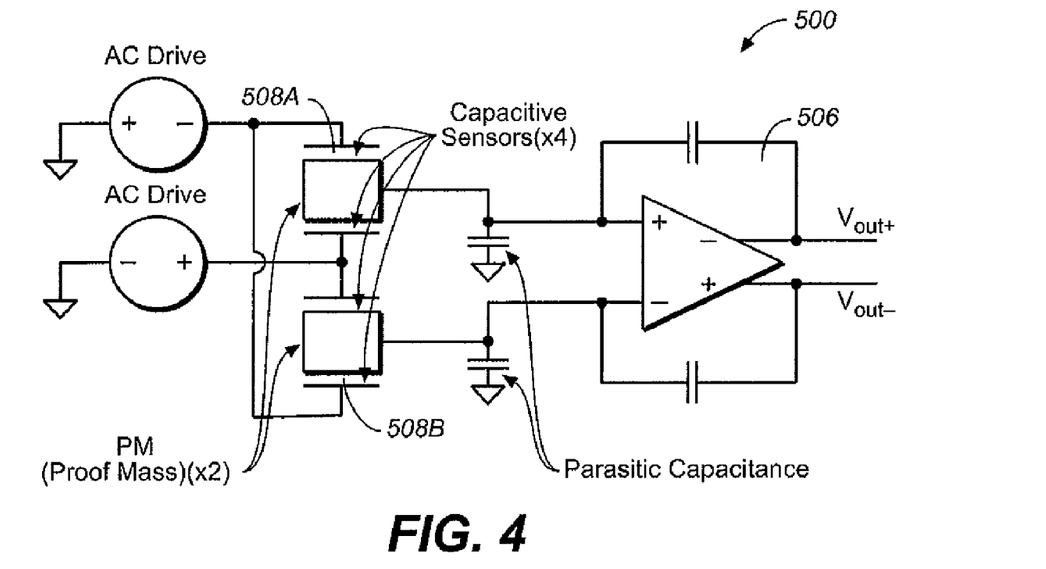
FIG. 4 illustrates a circuit which is electrode driven for sensing a change in capacitance in an accelerometer in accordance with the present invention.

The capacitance change of the accelerometers described above can be detected by various circuits. Here, only full bridge circuits are described but other means of capacitive detection such as pseudo bridge, half bridge can also be employed. FIG. 4 illustrates a circuit 500 which is electrode driven for sensing a change in capacitance in an accelerometer in accordance with the present invention. As is seen an AC voltage 502 is applied to the sense electrodes 804a and 504b and the output voltage is detected off the proof masses 508a and 508b utilizing an operational amplifier 506. When there is no acceleration the output voltage is zero. Acceleration of the proof masses 508a and 508b gives rise to an AC voltage at the operational amplifier output which can be demodulated later.

Figure 5:
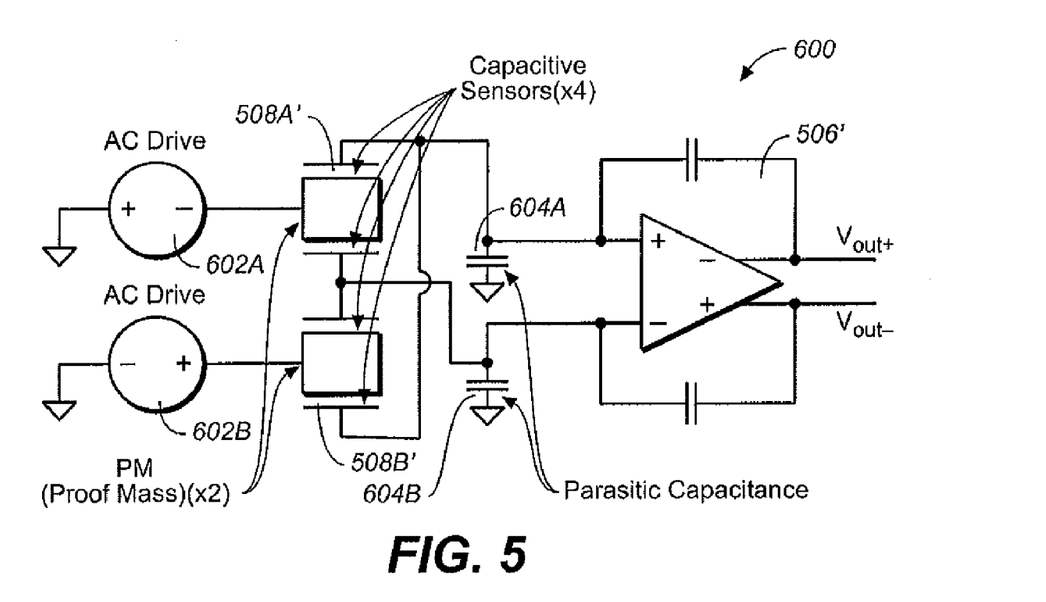
FIG. 5 illustrates a circuit which is proof mass driven for sensing a change in capacitance in an accelerometer in accordance with the present invention.

FIG. 5 illustrates a circuit 600 which is proof mass driven for sensing a change in capacitance in an accelerometer in accordance with the present invention. The advantage of the circuit of FIG. 5 is that the AC drive does not cause any motion on the proof masses 508a' and 508b'. The detection is determined by the amount of parasitic capacitances 604a and 604b. There is a parasitic capacitance between the proof mass and the ground as well as between the electrodes and the ground. The operational amplifier 506' is connected to the nodes where the parasitic capacitances 604a and 604b are lower.

Description of Variations and Alternate Embodiments

Figure 6:
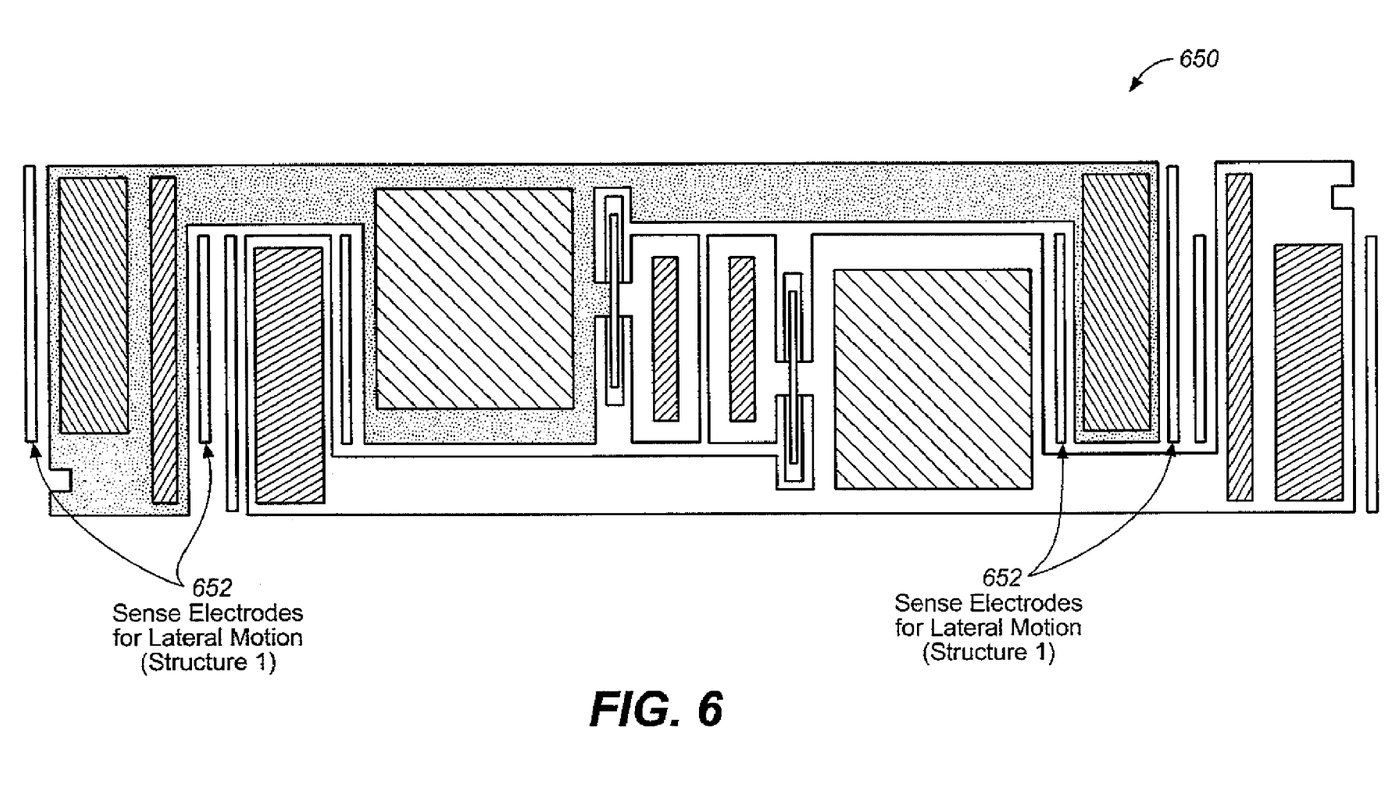
FIG. 6 shows an accelerometer with a combined X (or Y) axis and Z axis in accordance with the present invention.

The structures of FIGS. 2A, 2B, 3A and 3B can be combined to further reduce the size of the accelerometer 650. FIG. 6 shows a combined X (or Y) axis and Z axis accelerometer. For example, one can easily combine Y axis and Z axis by just adding electrodes 652 to the sides of the structure for the z-axis accelerometer. Since these structures are built using bulk micromachining the thickness is high allowing relatively high capacitance in the thickness direction. The accelerometer shown in FIG. 6 can be also be used in X direction by just rotating it.

Figure 7:
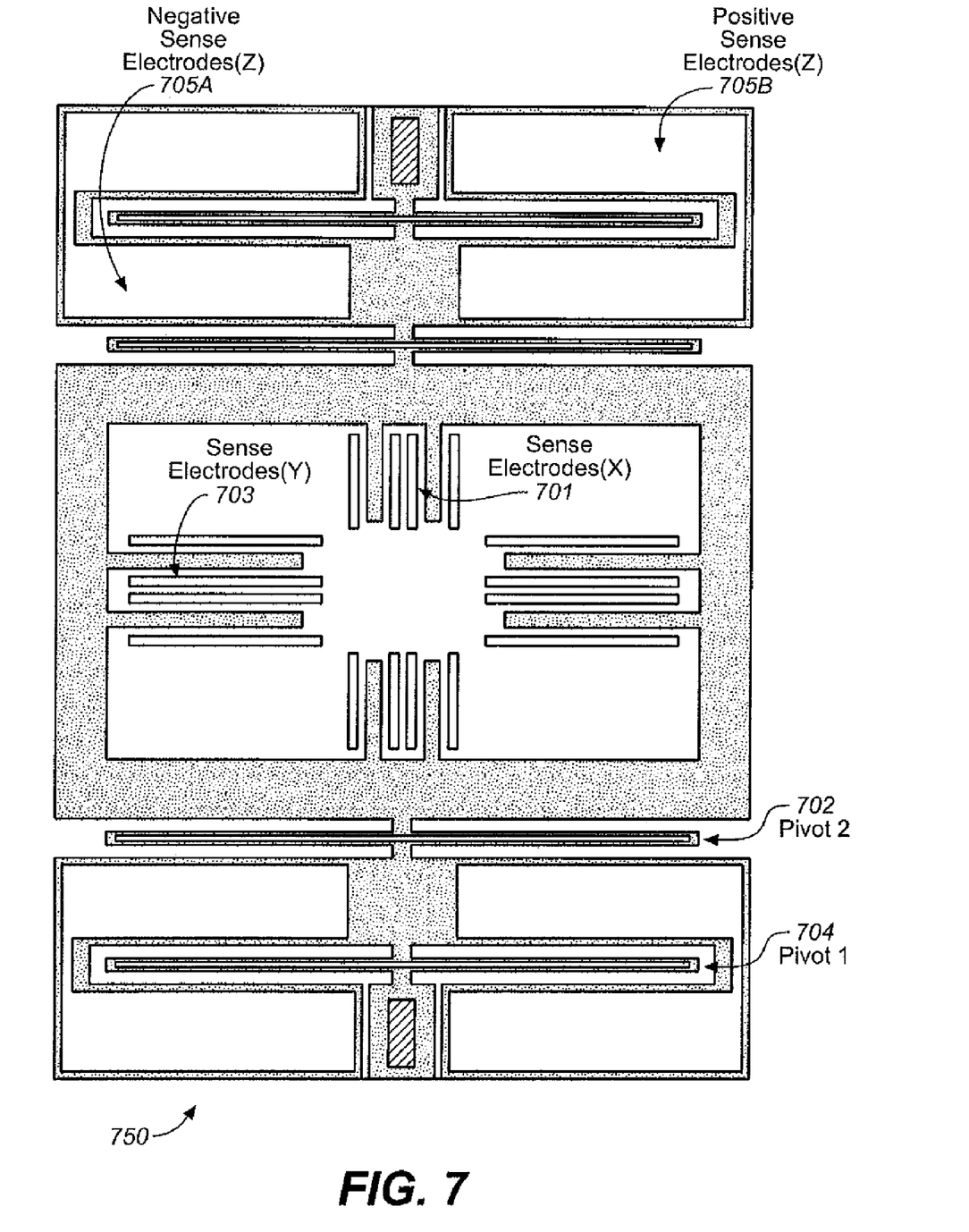
FIG. 7 shows an accelerometer in accordance with the present invention where all axes combined.

FIG. 7 shows another accelerometer 750 where all axes are combined. This allows very efficient use of chip area. The accelerometer shown in FIG. 7 combines all the proof masses. X-axis and y-axis acceleration sense electrodes 701 and 703 are similar to the structures shown in FIGS. 2A and 2B. For the axis z-axis, the center proof mass moves out of plane while bending the edge proof masses around the pivot points 702 and 704. This allows differential capacitance detection for the z-axis measurement.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An accelerometer comprising:
an actuator substrate;
a reference substrate; and
at least two proof masses substantially on the actuator substrate, and suspended over the reference substrate, wherein the at least two proof masses are not electrically or mechanically coupled to each other, the at least two proof masses substantially constrained to move only along the same axis; the at least two proof masses having at least one stationary electrode to form a capacitance which changes with the acceleration induced in one direction.

2. The accelerometer of claim 1 wherein the at least two proof masses comprise two proof masses constrained to move in substantially an x-direction to measure acceleration in the x-direction, at least two proof masses constrained to move in substantially a y-direction to measure acceleration in the y-direction, and at least two proof masses constrained to move in substantially a z-direction to measure acceleration in the z-direction.

3. The accelerometer of claim 1, which includes at least one damper to suppress a resonance quality factor.

4. The accelerometer of claim 1 which includes an integrated actuator for self-test, wherein the actuator comprises a parallel plate capacitor.

5. The accelerometer of claim 1 which includes travel stoppers in at least one of an x or a y direction.

6. The accelerometer of claim 1 wherein at least one proof mass of the at least two proof masses is connected electrically to the reference substrate at an anchor.

7. The accelerometer of claim 1 wherein a capacitance measurement is provided utilizing a half bridge configuration with the capacitance being in series with a constant capacitance.

8. The accelerometer of claim 1 wherein a capacitance measurement is provided utilizing a full bridge configuration with the capacitance being with three other capacitances.

9. The accelerometer of claim 7 wherein the capacitance measurement for the half bridge configuration is proof mass driven.

10. The accelerometer of claim 7 wherein the capacitance measurement for the half bridge configuration is electrode driven.

11. The accelerometer of claim 8 wherein the capacitance measurement for the full bridge configuration is proof mass driven.

12. The accelerometer of claim 8 wherein the capacitance measurement for the full bridge configuration is proof mass driven.

13. The accelerometer of claim 1 wherein a z-axis accelerometer comprises:
a reference substrate;
an actuator substrate;
a first and second structures located on the actuator substrate and each of the first and second structures including at least one lever arm, each of the structures being pivoted at a pivot point, wherein when there is acceleration in the z-direction each structure rotates around the pivot point, and including at least three proof mass sections on the lever arm, wherein electrodes are placed under a portion of the first and second structures and on the reference substrate to provide a differential measurement.

14. The accelerometer of claim 1 wherein the at east one electrode forms a parallel plate capacitance.

15. The accelerometer of claim 1 wherein a full bridge configuration is utilized for capacitive measurement of the at least two proof masses.

16. The accelerometer of claim 15, wherein a full bridge configuration is utilized for capacitance measurement of the at least two proof masses constrained to move in the x-direction.

17. The accelerometer of claim 15, wherein a full bridge configuration is utilized for capacitance measurement of the at least two proof masses constrained to move in the y-direction.

18. The accelerometer of claim 15, wherein a full bridge configuration is utilized for capacitance measurement of the at least two proof masses constrained to move in the z-direction.

19. The accelerometer of claim 15, wherein capacitance measurement by the full bridge configuration is proof mass driven.

20. The accelerometer of claim 15, wherein capacitance measurement by the full bridge configuration is electrode driven.

21. An accelerometer comprising:
an actuator substrate;
a reference substrate; and
at least two proof-masses, each of the at least two proof masses, substantially on the actuator substrate and bonded to the reference substrate at an anchor, with at least one flexure spring, suspended over the reference substrate, wherein the at least two proof masses are not electrically or mechanically coupled to each other; the at least two proof masses substantially constrained to move only along the same axis; each of the at least two proof masses having at least one stationary electrode to form a capacitance which changes with the acceleration induced in one direction;
wherein the at least two proof masses are connected electrically to the reference substrate at an anchor;
wherein the reference substrate comprises a CMOS integrated circuit.

22. The accelerometer of claim 21 in which the bond is a eutectic bond.

* * * * *

UNITED STATES PATENT AND TRADEMARK OFFICE
CERTIFICATE OF CORRECTION

PATENT NO. : 8,047,075 B2
APPLICATION NO. : 11/766776
DATED : November 1, 2011
INVENTOR(S) : Steven S. Nasiri, Joseph Seeger and Goksen G. Yaralioglu It is certified that error appears in the above-identified patent and that said Letters Patent is hereby corrected as shown below:

In the Claims:

Column 7, lines 56-58, claim 12, delete "12. The accelerometer of claim 8 wherein the capacitance measurement for the full bridge configuration is proof mass driven."

Signed and Sealed this
Second Day of July, 2013

Teresa Stanek Rea
*Acting Director of the United States Patent and Trademark Office*